(12) United States Patent
Tsou

(10) Patent No.: US 12,519,647 B2
(45) Date of Patent: Jan. 6, 2026

(54) IDENTITY VERIFICATION SYSTEM, USER DEVICE AND IDENTITY VERIFICATION METHOD

(71) Applicant: DeCloak Intelligences Co., Taipei (TW)

(72) Inventor: Yao-Tung Tsou, Taipei (TW)

(73) Assignee: DeCloak Intelligences Co., Taipei (TW)

( * ) Notice: Subject to any disclaimer, the term of this patent is extended or adjusted under 35 U.S.C. 154(b) by 76 days.

(21) Appl. No.: 18/508,232

(22) Filed: Nov. 14, 2023

(65) Prior Publication Data

US 2024/0187242 A1 Jun. 6, 2024

Related U.S. Application Data

(60) Provisional application No. 63/532,675, filed on Aug. 14, 2023, provisional application No. 63/434,911,
(Continued)

(51) Int. Cl.
*H04L 9/32* (2006.01)
*H04L 9/08* (2006.01)

(52) U.S. Cl.
CPC .......... *H04L 9/3231* (2013.01); *H04L 9/0866* (2013.01)

(58) Field of Classification Search
None
See application file for complete search history.

(56) References Cited

U.S. PATENT DOCUMENTS 8,311,973 B1 11/2012 Zadeh
2014/0337634 A1* 11/2014 Starner .............. H04W 12/33
713/186
(Continued)

FOREIGN PATENT DOCUMENTS

CN 109769105 5/2019
CN 105184277 2/2020
(Continued)

OTHER PUBLICATIONS

"Office Action of Taiwan Related Application, Application No. 112143712", issued on Aug. 7, 2024, p. 1-p. 6.
(Continued)

*Primary Examiner* — William J. Goodchild
(74) *Attorney, Agent, or Firm* — JCIPRNET

(57) ABSTRACT

Disclosed are an identity verification system and method. In the method, a user device captures a first biometric feature of a user by using a first biometric feature capturing device, performs de-identification processing on the first biometric feature to obtain first de-identified data, transforms the first de-identified data into a feature vector including de-identified features and stores the same in a storage device, and dynamically generates a self-key including the feature vector in response to an activation operation. A verification device captures the self-key by using a data capturing device, captures a second biometric feature by using a second biometric feature capturing device, performs the de-identification processing on the second biometric feature, transforms the result into a feature vector including de-identified features to compare with the feature vector in the self-key, and verifies the second biometric feature according to a comparison result.

15 Claims, 7 Drawing Sheets

Related U.S. Application Data filed on Dec. 22, 2022, provisional application No. 63/425,274, filed on Nov. 14, 2022.

(56) References Cited

U.S. PATENT DOCUMENTS

| | | |
|---|---|---|
| 2017/0180125 A1 | 6/2017 | Bobinski |
| 2019/0031145 A1 | 1/2019 | Trelin |
| 2019/0280869 A1 | 9/2019 | Streit |
| 2020/0254974 A1* | 8/2020 | Gordon ............... B60R 25/25 |
| 2021/0200851 A1 | 7/2021 | Perry et al. |
| 2021/0229633 A1 | 7/2021 | Delong |
| 2021/0403017 A1 | 12/2021 | Bielby |
| 2023/0076017 A1 | 3/2023 | Choi |
| 2023/0222843 A1 | 7/2023 | Zhu |
| 2024/0022601 A1 | 1/2024 | Yennapureddy |
| 2024/0153326 A1 | 5/2024 | Saito et al. |

FOREIGN PATENT DOCUMENTS

| | | |
|---|---|---|
| CN | 111046422 | 3/2021 |
| CN | 113935915 | 1/2022 |
| CN | 111476200 | 4/2022 |
| CN | 114697464 | 7/2022 |
| CN | 114817986 | 7/2022 |
| CN | 114936377 | 8/2022 |
| CN | 114998971 | 9/2022 |
| CN | 115050131 | 9/2022 |
| JP | 2020144443 | 9/2020 |
| KR | 20200014889 A | 2/2020 |
| KR | 20220124288 A | 9/2022 |
| KR | 20230030251 A | 3/2023 |
| TW | 201913451 | 4/2019 |
| TW | M620132 | 11/2021 |
| TW | I768625 | 6/2022 |
| TW | 202226047 | 7/2022 |
| TW | 202236163 | 9/2022 |
| WO | WO-2021091661 A1 * | 5/2021 ............... A61B 6/50 |

OTHER PUBLICATIONS

"Office Action of Taiwan Related Application, Application No. 112128407", issued on Aug. 21, 2024, p. 1-p. 5.
"Office Action of Japan Related Application, Application No. 2024063400", issued on May 20, 2025, p. 1-p. 3.
"Office Action of U.S. Related Application, U.S. Appl. No. 18/462,410", issued on May 21, 2025, p. 1-p. 17.
"Office Action of Taiwan Related Application, Application No. 112128407", issued on Jun. 13, 2025, p. 1-p. 10.
"Office Action of Taiwan Counterpart Application", issued on Jun. 17, 2025, p. 1-p. 21.
"Office Action of Taiwan Related Application, Application No. 112127136", issued on Jun. 18, 2025, p. 1-p. 15.
"Office Action of U.S. Appl. No. 18/461,517", issued on Sep. 15, 2025, p. 1-p. 16.
"Office Action of U.S. Appl. No. 18/508,181", issued on Sep. 16, 2025, p. 1-p. 16.
Newton et al., "Preserving Privacy by De-Identifying Face Images", IEEE Transactions on Knowledge and Data Engineering ( vol. 17, Issue: 2, Feb. 2005).
"Office Action of Taiwan related Application No. 112128407", issued on Oct. 1, 2025, p. 1-p. 10.
Li Ping-Xi, "A Hybrid Face Recognition System Based on Mutual Correction of Classification Models Trained by Two Deep Neural Networks Graduate", Southern Taiwan University of Science and Technology Master's Thesis, Date of Thesis Publication: Apr. 19, 2022.
"Office Action of U.S. Appl. No. 18/508,198", issued on Nov. 7, 2025, p. 1-p. 15.
"Office Action of Korea. related Application No. 10-2024-0062498", issued on Nov. 12, 2025, p. 1-p. 7.
Arnaud Grivet Sebert, Combining differential privacy and homomorphic encryption for privacy-preserving collaborative machine learning, Doctoral thesis from Paris-Saclay University, defended at Paris-Saclay on Jun. 12, 2023.

* cited by examiner

IDENTITY VERIFICATION SYSTEM, USER DEVICE AND IDENTITY VERIFICATION METHOD

CROSS-REFERENCE TO RELATED APPLICATION

This application claims the priority benefit of U.S. provisional application Ser. No. 63/425,274, filed on Nov. 14, 2022, U.S. provisional application Ser. No. 63/434,911, filed on Dec. 22, 2022, and U.S. provisional application Ser. No. 63/532,675, filed Aug. 14, 2023. The entirety of each of the above-mentioned patent applications is hereby incorporated by reference herein and made a part of this specification.

BACKGROUND

Technical Field

The present disclosure relates to an identification system and method, and in particular to an identity verification system, a user device and an identity verification method.

Description of Related Art

Facial identification has been adopted by various industries as a favorable solution for the reason that facial identification is able to ensure access control, provide comprehensive identity verification, facilitate marketing and services, and accelerate financial operations. However, the applications of facial identification often come at the expense of user interests, such as privacy and even security. Worse yet, facial identification for access control systems leaves businesses concerned that their face databases might be leaked, and thus leading to violation of privacy regulations and/or incurrence of high maintenance costs.

In conventional solutions, typically all sensitive face data are outsourced to a central server, or a decentralized model is implemented for local use. However, outsourcing solutions violates privacy regulations because user information is exposed to third-party service providers or unsecured execution environments. On the other hand, although local solutions are able to protect user privacy to a certain extent, there is still a risk of device theft, and the data and privacy might be leaked; besides, the local solutions are limited in terms of scalability, flexibility, and power consumption.

SUMMARY

The present disclosure provides an identity verification system and method, which may perform secure identity verification without leaking privacy.

The present disclosure provides an identity verification system, which includes a data capturing device and a second processor. The data capturing device is disposed to capture a self-key, wherein the self-key is generated by a first processor, and the first processor performs de-identification processing on a first biometric feature to obtain a first de-identified data, transform the first de-identified data into a first feature vector including a plurality of first de-identified features, and dynamically generate a self-key including the first feature vector in response to an activation operation. The second processor is disposed to capture the second biometric feature to be identified, perform de-identification processing on the second biometric feature to obtain a second de-identified data, transform the second de-identified data into a second feature vector including a plurality of second de-identified data, and compare the second feature vector with the first feature vector in the self-key to verify the second biometric feature based on the comparison result.

In some embodiments, the first processor further dynamically generates an identification code including the first feature vector and time series information as the self-key in response to the activation operation.

In some embodiments, the second processor further interprets the first feature vector and the time series information in the identification code, compares the first feature vector with the second de-identified data, and compares the time series information with the current time information to verify the second biometric feature based on the comparison result.

In some embodiments, the data capturing device uses a quick response code (QR code) to establish a connection with the first processor.

In some embodiments, the first processor employs a deep learning model that supports privacy protection technology to de-identify the first biometric feature.

In some embodiments, the deep learning model includes a plurality of neurons divided into multiple layers. The first biometric feature is transformed into a feature value of a plurality of neurons at a first layer among the multiple layers, and the transformed feature value of each neuron is added to the noise generated using a privacy parameter and then input into the next layer. After multiple layers of processing, the first de-identified data is obtained.

In some embodiments, the identity verification system further includes a storage device, and the first processor further encrypts the first feature vector using a data encryption technology, and stores the encrypted first feature vector in the storage device.

In some embodiments, the second processor further employs a data decryption technology corresponding to the data encryption technology to decrypt the encrypted first feature vector in the self-key to obtain the first de-identified feature vector.

In some embodiments, the second processor further employs a biometric identification technology to identify the living body in the second biometric feature, and when identifying that there is a living body in the second biometric feature, de-identification processing is performed on the second biometric feature.

In some embodiments, the biometric identification technology includes blink detection, deep learning features, challenge-response technology or a three-dimensional stereo camera.

The present disclosure provides an identity verification method, which is adaptable for an identity verification system including a user device and a verification device. The method includes the following steps: capturing a first biometric feature by a first biometric feature capturing device of the user device; performing de-identification processing on the first biometric feature to obtain first de-identified data, transform the first de-identified data into a first feature vector including a plurality of de-identified features and store the first feature vector in a storage device, and dynamically generate a self-key including the first feature vector in response to an activation operation; capturing a self-key from the user device by a data capturing device of the verification device; capturing, a second biometric feature to be identified by a second biometric feature capturing device; and performing a de-identification processing on the second biometric feature to obtain the second de-identified data, and transform the second de-identified data into a second feature vector including a plurality of second de-identified features to compare with the de-identified feature vector in the self-key, and verify the second biometric feature according to a comparison result.

In some embodiments, the user device further dynamically generates an identification code including a feature vector and time series information as a self-key in response to an activation operation.

In some embodiments, the verification device further interprets the feature vector and time series information in the identification code, compares the feature vector with the second de-identified data, and compares the time series information with the current time information (time window) to verify the second biometric feature based on the comparison result.

In some embodiments, the verification device employs a quick response code (QR code) to establish a connection with the user device.

In some embodiments, the user device employs a deep learning model that supports privacy protection technology to de-identify the first biometric feature.

In some embodiments, the deep learning model includes a plurality of neurons divided into multiple layers. The first biometric feature is transformed into a feature value of a plurality of neurons at a first layer among the multiple layers, and the transformed feature value of each neuron is added to the noise generated using a privacy parameter and then input into the next layer. After multiple layers of processing, the first de-identified data is obtained.

In some embodiments, the user device further encrypts the first feature vector using a data encryption technology, and stores the encrypted first feature vector in the storage device.

In some embodiments, the verification device further employs a data decryption technology corresponding to the data encryption technology to decrypt the encrypted first feature vector in the self-key to obtain the first feature vector.

In some embodiments, the verification device further employs a biometric identification technology to identify the living body in the second biometric feature, and when identifying that there is a living body in the second biometric feature, de-identification processing is performed on the second biometric feature.

The present disclosure provides a user device, which includes a biometric feature capturing device and a processor. The biometric feature capturing device is disposed to capture biometric features. The processor is disposed to de-identify the biometric features to obtain de-identified data, transform the de-identified data into a feature vector containing a plurality of de-identified features, and dynamically generate a self-key containing the feature vector in response to an activation operation. The processor further dynamically generates an identification code including a feature vector and time series information as the self-key in response to the activation operation.

Based on the above, the identity verification system and identity verification method of the present disclosure may achieve traceless identification by de-identifying the biometric features of the user and storing the de-identified data on the user end. The identity verification system may achieve a flexible balance to adapt to different security and privacy requirements, and by dynamically generating self-keys in real time, it is possible to avoid storing data in third-party systems, which helps to reduce the risk of privacy leaks and system maintenance costs.

In order to make the above-mentioned features and advantages of the present disclosure more clear and easy to understand, embodiments are given below and described in detail with reference to the attached drawings.

DESCRIPTION OF THE EMBODIMENTS

In finance, healthcare, cryptocurrency, and electronic signature platforms, it is important to make sure that privacy is not leaked when collecting information. The identity verification system of the embodiment of the present disclosure is specially designed and established for edge computing, and stores an artificial intelligence (AI) identification model to achieve high computing efficiency. Embodiments of the present disclosure further provide privacy and security identity verification. Data processing is only completed on the local device, and sensitive personal biometric features will not be uploaded to the cloud to avoid data leakage.

Figure 1:
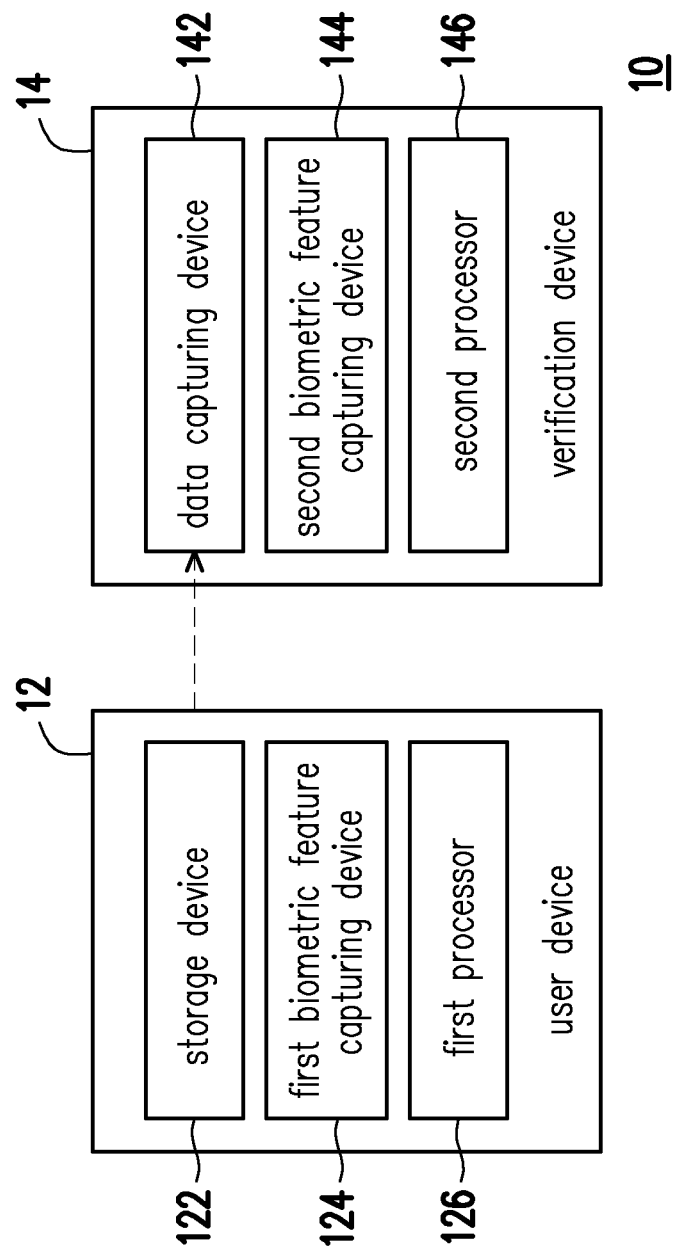
FIG. 1 is a block diagram of an identity verification system according to an embodiment of the present disclosure.

FIG. 1 is a block diagram of an identity verification system according to an embodiment of the present disclosure. Referring to FIG. 1, the identity verification system 10 of this embodiment includes a user device 12 and a verification device 14. The user device 12 is, for example, a mobile device such as a mobile phone, a tablet computer, or a notebook computer carried by the user. The verification device 14 is, for example, an access control system disposed at the entrance or other devices that need to verify the identity of a person.

The user device 12 includes a storage device 122, a first biometric feature capturing device 124 and a first processor 126. The storage device 122 is, for example, any type of fixed or removable random access memory (RAM), a read-only memory (ROM), a flash memory, a hard disk or similar components or a combination of the above components, which is disposed to store computer programs that can be executed by the first processor 126 and data generated by the first processor 126.

The first biometric feature capturing device 124 is, for example, an image capturing device, which includes a charge coupled device (CCD), a complementary metal-oxide semiconductor (CMOS) device or other types of photosensitive devices that are able to sense light intensity to generate an image of the image capturing scene. In some embodiments, the image capturing device further includes an image signal processor (ISP), which may process the captured images.

In other embodiments, the first biometric feature capturing device 124 may also be a sensor for detecting biometric features such as the user's voice, fingerprints, palm prints, iris, retina, veins, etc., so that the first processor 126 is able to realize biometric identification such as voice identification, fingerprint identification, palm print identification, iris identification, retina identification, vein identification, etc. based on the sensing results, and the present disclosure is not limited thereto.

The first processor 126 is, for example, a central processing unit (CPU), or other programmable general-purpose or special-purpose microprocessor, a microcontroller, a digital signal processor (DSP), a programmable controller, an application specific integrated circuit (ASIC), a programmable logic device (PLD) or other similar devices or a combination of the devices, the present disclosure is not limited thereto. In this embodiment, the first processor 126 may load a computer program from the storage device 122 to execute the identity verification method in this embodiment of the present disclosure.

The verification device 14 includes a data capturing device 142, a second biometric feature capturing device 144 and a second processor 146.

The data capturing device 142 is, for example, a communication device that supports communication protocols such as wireless fidelity (Wi-Fi), radio frequency identification (RFID), Bluetooth, infrared, near-field communication (NFC) or device-to-device (D2D), or a network connection device that supports Internet connection, and is disposed for communicating or connecting to the Internet with the user device 12, and capturing data from the user device 12.

The type and function of the second biometric feature capturing device 144 are the same or similar to the first biometric feature capturing device 124, and the type and function of the second processor 146 are the same or similar to the first processor 126, so the details will not be repeated here.

Figure 2A:
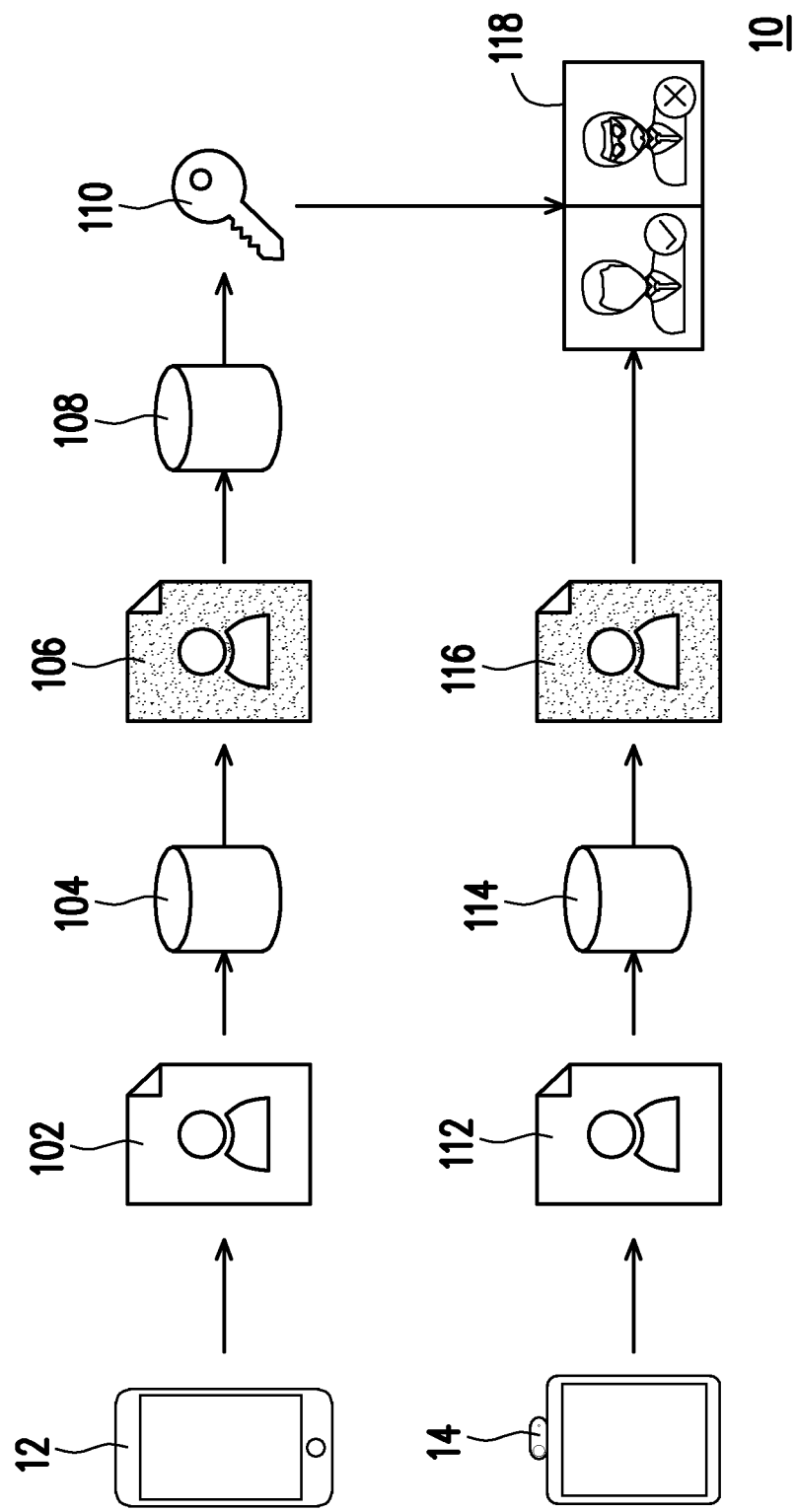
FIG. 2A and FIG. 2B are schematic views of an application scenario of the identity verification system according to an embodiment of the present disclosure.
Figure 2B:
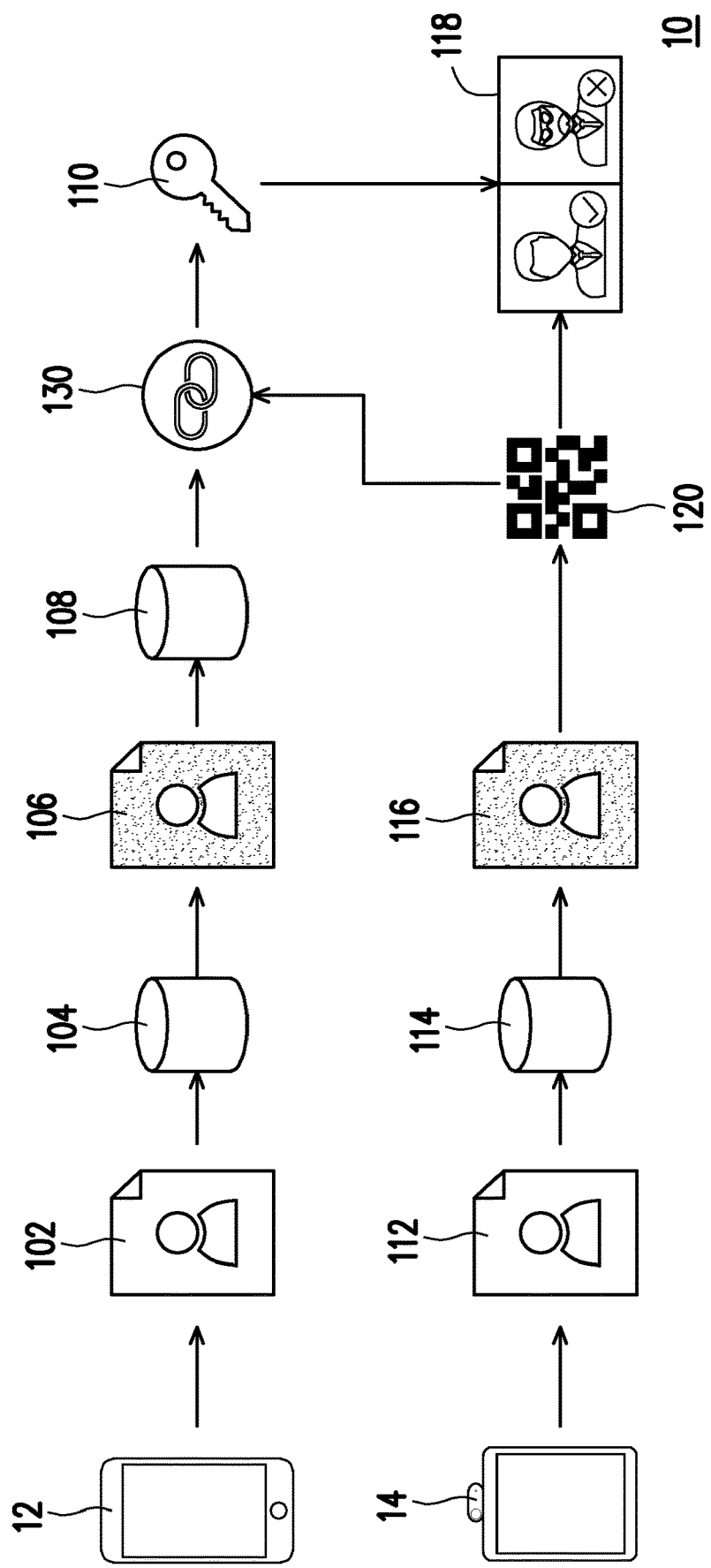

Based on the architecture of the above-mentioned identity verification system 10, the identity verification process of this embodiment is divided into a registration stage and an identification stage. FIG. 2A and FIG. 2B are schematic views of an application scenario of the identity verification system according to an embodiment of the present disclosure. Referring to FIG. 2A, in the registration stage, the user device 12 employs the first biometric feature capturing device 124 to capture the biometric feature 102 of the user of the user device 12. In an embodiment, the user device 12 may employ an image capturing device to capture images of the image capturing scene, and execute a face identification algorithm on the captured images to obtain the face image of the user and use the face image as the biometric features 102 of the user. In other embodiments, the user device 12 may also employ other biometric sensors to detect the user's voice, fingerprints, palm prints, iris, retina, and veins as the biometric features 102 of the user. This embodiment is not limited thereto.

Next, the user device 12 employs the deep learning model 104 that supports privacy protection technology to perform de-identification processing on the biometric feature 102 to obtain de-identified data 106, and transform the de-identified data 106 into a feature vector 108 that includes a plurality of de-identified features and store the feature vector 108 in the storage device 122. The above-mentioned privacy protection technologies include differential privacy, homomorphic encryption, shuffle or pixelate, but are not limited thereto.

In response to the user's activation operation, the user device 12 will dynamically generate a self-key 110 including the feature vector 108 in the storage device 122. The self-key 110 is, for example, a quick response code (QR code) or other types of one-dimensional, two-dimensional or three-dimensional barcodes, the embodiment is not limited thereto. In some embodiments, the self-key is a de-identified face information random code with time series or is referred to as a de-identified face feature vector with time series. In some embodiments, in response to the user's activation operation, the user device 12 may dynamically generate an identification code including the feature vector 108 and time series information as the self-key 110, but is not limited thereto.

On the other hand, in the identification stage, the verification device 14 employs the data capturing device 142 to capture the self-key from the user device 12, and employs the second biometric feature capturing device 144 to capture the biometric feature 112 of the current user to be identified. In an embodiment, the verification device 14 may employ an image capturing device to capture images of the image capturing scene, and execute a face identification algorithm on the captured images to obtain the face image of the current user, and use the face image of the current user as the biometric feature 112 of the current user. In other embodiments, the verification device 14 may also employ other biometric sensors to detect the voice, fingerprints, palm prints, iris, retina, and veins of the current user, and use them as the biometric feature 112 of the current user.

Next, the verification device 14 employs the deep learning model 114 that supports privacy protection technology to de-identify the biometric features 112 to obtain de-identified data 116, and transform the de-identified data 116 into the feature vector that includes a plurality of de-identified features to compare the feature vector with the feature vector 108 in the self-key 110 captured from the user device 12, so as to verify the identity of the current user based on the comparison result 118. If the feature vector matches the feature vector 108, it may be confirmed that the identity of the current user is legal; otherwise, it may be confirmed that the identity of the current user is illegal.

In some other embodiments, the verification device 14 provides a quick response code. When the user performs an activation operation on the user device 12, the user device 12 and the verification device 14 first establish a connection using the quick response code.

Please refer to FIG. 2B. The steps in the registration stage of this embodiment are the same as FIG. 2A. The user device 12 employs the first biometric feature capturing device 124 to capture the biometric features 102 of the user of the user device 12, employs the deep learning model 104 that supports privacy protection technology to perform de-identification processing on the biometric features 102 to obtain de-identified data 106, and transform the de-identified data 106 into a feature vector 108 containing a plurality of de-identified features to store the feature vector 108 in the storage device 122.

On the other hand, in the identification stage of this embodiment, the verification device 14 employs the data capturing device 142 to capture the self-key from the user device 12, employs the second biometric feature capturing device 144 to capture the biometric features 112 of the current user to be identified, employs the deep learning model 114 that supports privacy protection technology to de-identify the biometric features 112 to obtain the de-identified data 116, and transform the de-identified data 116 into a feature vector that includes a plurality of de-identified features.

Different from the embodiment of FIG. 2A, in this embodiment, in the identification stage, when the verification device 14 detects that the user of the user device 12 has arrived at a place or come to an equipment that requires identity verification and is to perform identity verification, a quick response code 120 containing link information is generated, so that the user device 12 may obtain the quick response code 120 through image capturing or wireless access, and use the link information to establish a connection 130 with the verification device 14. In this way, the verification device 14 may capture the self-key 110 from the user device 12 through the connection 130, and compare the feature vector 108 in the self-key 110 with the feature vector generated by the verification device 14 itself, so as to verify the identity of the current user according to the comparison result 118. If the feature vector matches the feature vector 108, it may be confirmed that the identity of the current user is legal; otherwise, it may be confirmed that the identity of the current user is illegal.

Figure 3:
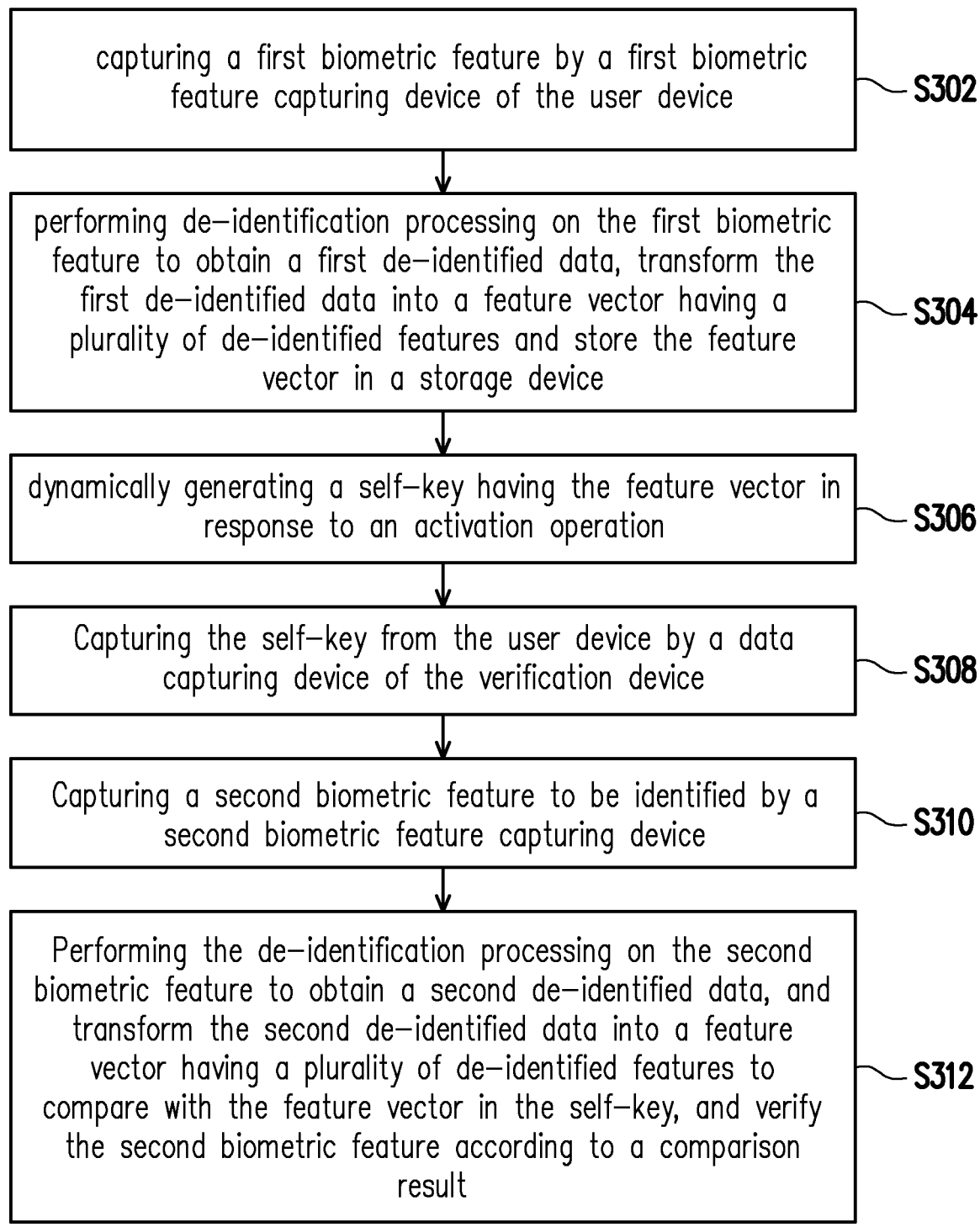
FIG. 3 is a schematic view of an identity verification method according to an embodiment of the present disclosure.

Specifically, FIG. 3 is a schematic view of an identity verification method according to an embodiment of the present disclosure. Please refer to FIG. 1 and FIG. 3 simultaneously. The identity verification method of this embodiment is applicable to the identity verification system 10 of FIG. 1.

In step S302, the user device 12 employs the first biometric feature capturing device 124 to capture the first biometric feature. The first biometric features are, for example, the user's face, voice, fingerprints, palm prints, iris, retina, veins, etc., and the disclosure is not limited thereto.

In step S304, the user device 12 performs de-identification processing on the first biometric feature to obtain the first de-identified data, and transforms the first de-identified data into the feature vector including a plurality of de-identified features, and stores the feature vector in the storage device 122.

In some embodiments, the user device 12 employs a deep learning model that supports privacy protection technology to de-identify the first biometric feature. The above-mentioned deep learning model includes multiple neurons divided into multiple layers, in which the first biometric feature is transformed into a feature value of a plurality of neurons at a first layer among the multiple layers, and the transformed feature value of each neuron is added to the noise generated using a privacy parameter and then input into the next layer. After multiple layers of processing, the de-identified image data is obtained.

In detail, the deep learning model of this embodiment is a neural network model that performs privacy protection through the privacy protection algorithm of feature domain operation, that is, $N_{x_i} + \aleph(0, \varepsilon^2)$, wherein $N_{x_i}$ is the specific data in the neural network, and $\aleph$ is the noise calculated using a noise distribution or permutation algorithm with a privacy parameter $\varepsilon$. It should be noted that $N_{x_i}$ is variable, which may be adjusted by a neural layer according to computing resources, privacy loss and model quality.

In step S306, the user device 12 dynamically generates a self-key including a feature vector in response to the user's activation operation of the user device 12.

In step S308, the verification device 14 employs the data capturing device 142 of the verification device 14 to capture the self-key from the user device 12.

It should be noted that when the user of the user device 12 arrives at a place or comes to an equipment that requires identity verification and is to perform identity verification, the user may perform an activation operation on the user device 12 so that the user device 12 employs the feature vector stored in the storage device 122 to generate a one-time self-key for the data capturing device 142 of the verification device 14 to capture and use the self-key to verify the identity of the user. The above-mentioned self-key is, for example, a quick response code (QR code) or other types of one-dimensional, two-dimensional or three-dimensional barcodes, and this embodiment is not limited thereto.

In step S310, the verification device 14 employs the second biometric feature capturing device 144 to capture the second biometric feature to be identified.

In step S312, the verification device 14 de-identifies the second biometric feature to obtain the second de-identified data, and transforms the second de-identified data into a feature vector containing a plurality of de-identified features, and compare the feature vector with the feature vector in the self-key to verify the second biometric feature based on the comparison result. The verification device 14 also employs a deep learning model that supports privacy protection technology to perform de-identification processing and feature transformation on the second biometric feature. The de-identification processing and feature transformation are the same as or correspond to the aforementioned de-identification processing and feature transformation performed by the user device 12. The verification device 14 compares the feature vector that is obtained similarly through de-identification processing and feature transformation with the feature vector in the self-key captured from the user device 12, and finally verifies whether the current user is the legal user of the user device 12.

The identity verification method of the embodiment employs the above-mentioned de-identification process to de-identify the face, fingerprints and other biometric information of the user of the user device 12 and stores the biometric information in the storage device 122 of the user device 12, thereby realizing traceless identification, and the identity verification system 10 may achieve a flexible balance to adapt to different security and privacy requirements.

In some embodiments, the identity verification system only includes the data capturing device 142 and the second processor 146. The data capturing device 142 is disposed to capture a self-key, wherein the self-key is generated by the first processor 126, and the first processor 126 de-identifies the first biometric feature of the user using the device to obtain the first de-identified data, transforms the first de-identified data into a first feature vector including a plurality of first de-identified features, and dynamically generates a self-key containing first feature vector in response to the activation operation. The second processor 146 is disposed to capture the second biometric feature of the current user to be identified for de-identification processing to obtain the second de-identified data, transforms the second de-identified data into the second feature vector including a plurality of second de-identified features, and compares the second feature vector with the first feature vector in the self-key to verify the identity of the current user based on the comparison result.

In some embodiments, after the user device 12 transforms the first de-identified data into a feature vector including a plurality of de-identified features, the user device 12 may use a data encryption technology (symmetric or asymmetric encryption) to encrypt the feature vector, and store the encrypted feature vector in the storage device 122. Correspondingly, after capturing the self-key from the user device 12, the verification device 14 will, for example, employ a data decryption technology corresponding to the above-mentioned data encryption technology to decrypt the encrypted feature vector in the self-key to obtain the de-identified feature vector. In this way, it is possible to provide high-level security protection to prevent data leakage and identity theft.

In some embodiments, the user device 12 may dynamically generate an identification code including a feature vector and time series information as a self-key in response to an activation operation. In some other embodiments, the verification device 14 provides a quick response code. When the user of the user device 12 arrives at a place or comes to an equipment that requires identity verification and is to perform identity verification, when the user performs an activation operation on the user device 12, the user device 12 and the verification device 14 first establish a connection by using the quick response code, but are not limited thereto.

When the verification device 14 employs the data capturing device 142 to capture the self-key, for example, the verification device 14 will interpret the feature vector and time series information in the identification code, and while comparing the feature vectors, the verification device 14 will also compare the time series information with the current time information (time window) to verify the identity of the current user based on the comparison result. Since the identification code used as the self-key is generated dynamically in real time instead of being stored in a third-party system, such design helps to reduce the risk of privacy leaks and system maintenance costs. In the meantime, the identification speed is faster, thus providing users with an efficient and convenient identity verification experience.

The design of the above-mentioned identity verification system is flexible and may be easily integrated and interfaced with any existing system, and may also be customized according to specific needs. Enterprises of different industries may quickly and easily integrate the identity verification system of this embodiment into existing equipment or systems according to their own hardware equipment specifications and software requirements.

Figure 4:
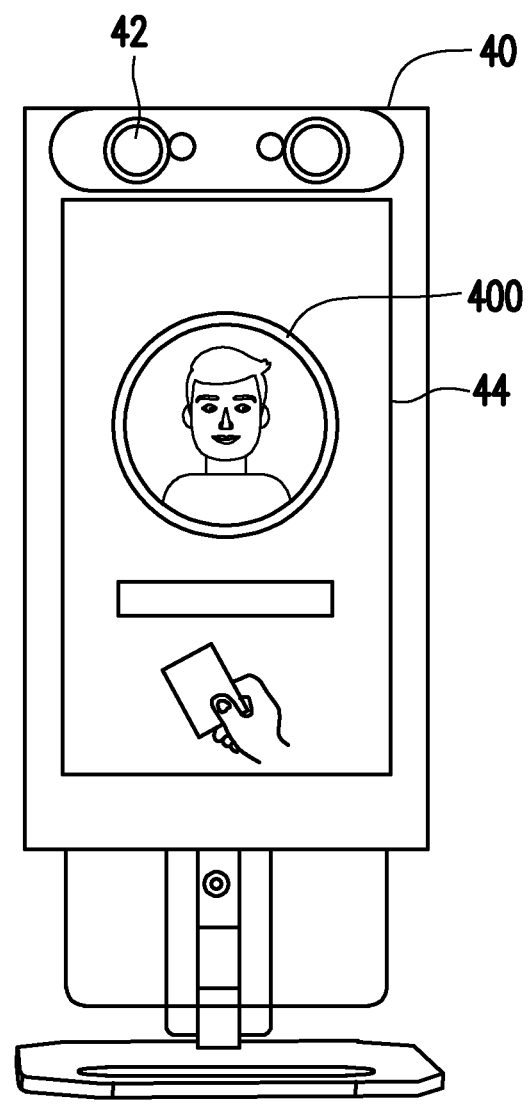
FIG. 4 is a schematic view of an access control system according to an embodiment of the present disclosure.

For example, the identity verification system may be integrated into the access control system to verify the identity of people entering the gate or entrance. FIG. 4 is a schematic view of an access control system according to an embodiment of the present disclosure. Please refer to FIG. 4. The access control system 40 of this embodiment is integrated with the identity verification system 10 of FIG. 1 to verify the identity of the person who wants to enter the gate or entrance, and accordingly opens the door or allows the person to enter the entrance.

The access control system 40 includes an image capturing device 42, a display 44 and a data capturing device (not shown). The image capturing device 42 is disposed to capture the face image of the user who wants to enter the gate or entrance. The display 44 is disposed to display the face image 400 captured by the image capturing device 42 or the de-identified image, such as masking or face-changing. The data capturing device is disposed to capture the self-key of the user from the user device carried by the user to be identified, to verify the identity of the user in the face image 400 captured by the image capturing device 42, and determine whether to open the door or allow the user to enter the entrance based on the verification result.

In some embodiments, the de-identification performed on face images by the identity verification system and method of the present disclosure may include front-end image masking or face-changing methods, and back-end face image data destruction methods.

Figure 5A:
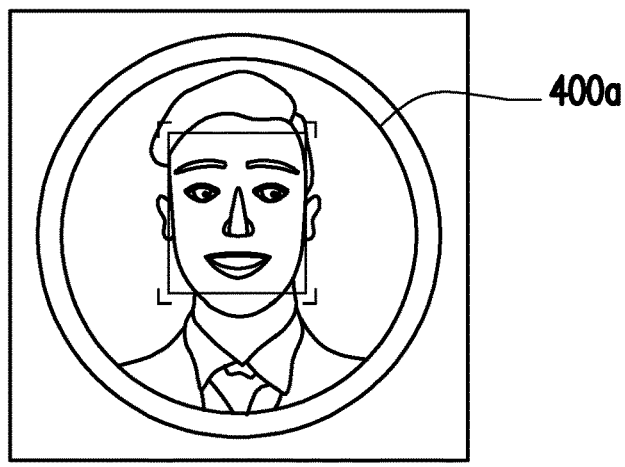
FIG. 5A to FIG. 5C are schematic views of images displayed by an access control system according to an embodiment of the present disclosure.
Figure 5B:
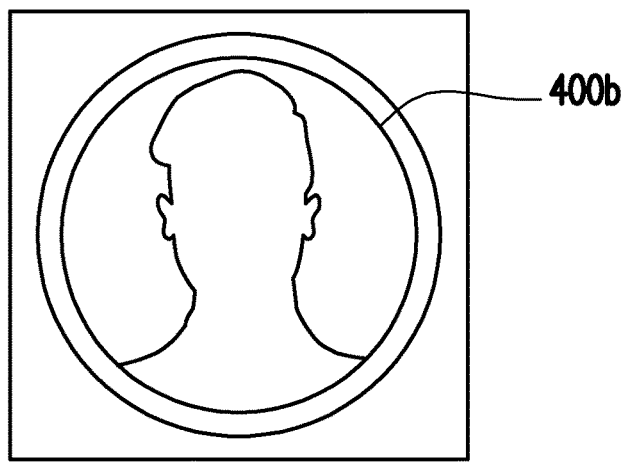
Figure 5C:
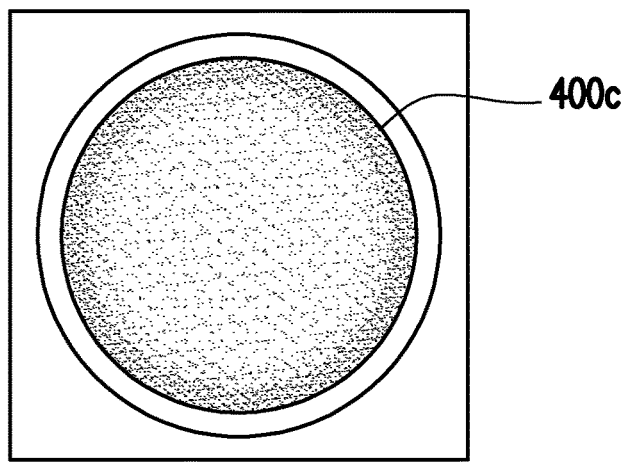

FIG. 5A to FIG. 5C are schematic views of images displayed by an access control system according to an embodiment of the present disclosure. This embodiment illustrates the content of the image 400 displayed on the display 44 by the access control system 40 in FIG. 4.

As shown in FIG. 5A, the access control system 40 may display the real face image 400a of the user on the display 44, thereby letting the user know that his or her face has been clearly captured by the image capturing device 42. It should be noted that after the image capturing device 42 captures the user's face image, the access control system 40 directly displays the face image on the display 44 and does not store the face image, so as to prevent the original data of the face image from being stolen by others.

However, considering that the face image displayed at the front end involves the privacy of the user, when the user sees his or her own image on the display 44, even if the image is not stored, the user might feel that his or her privacy has been violated. To address the issue, as shown in FIG. 6B, the access control system 40 may only display the user's contour 400b on the display 44, or adopt image masking or face-changing methods for display, thereby also enabling the user to know that his or her face has been captured by the image capturing device 42 and the user's privacy may be protected.

Alternatively, based on the fact that the backend has performed de-identification and other destructive processing on the face image data, as shown in FIG. 6C, the access control system 40 may display the de-identified face image 400c of the user on the display 44, so that it is possible to further protect the user's privacy. Since the original image is not stored, the de-identified face image 400c is not generated using the stored original image, so it is possible to prevent the original image from being leaked and causing privacy infringement.

In some embodiments, the verification device may combine the biometric identification technology to perform biometric identification of the current user to be identified. In this way, it is possible to prevent others from obtaining the user's face image or other biometric features in advance and using the biometric features to deceive the system.

Figure 6:
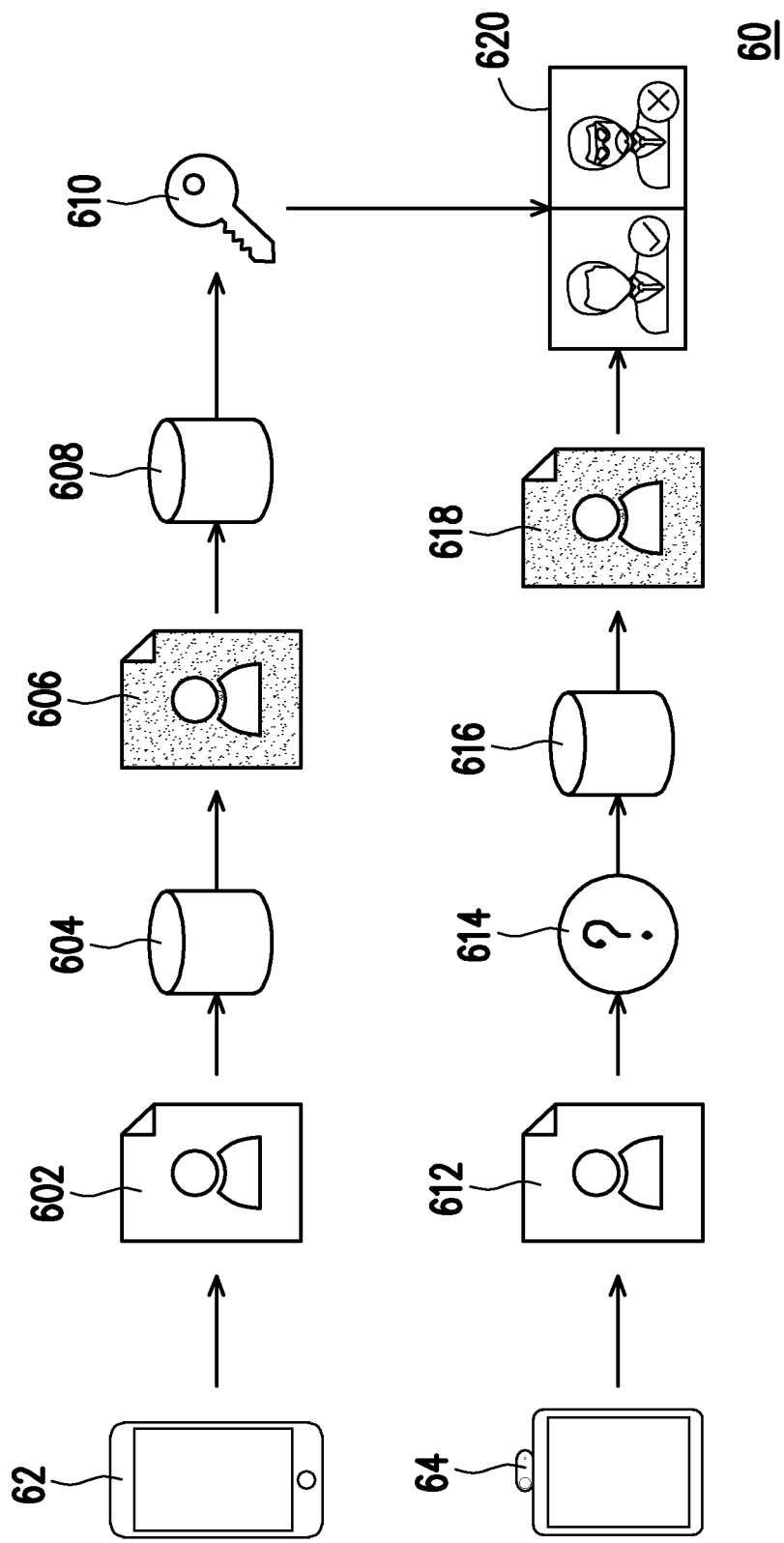
FIG. 6 is a schematic view of an application scenario of the identity verification system according to an embodiment of the present disclosure.

FIG. 6 is a schematic view of an application scenario of the identity verification system according to an embodiment of the present disclosure. Referring to FIG. 6, this embodiment is applicable to an identity verification system 60 including a user device 62 and a verification device 64.

In the registration stage, the user device 62, for example, employs a biometric feature capturing device to capture the biometric feature 602 of the user of the user device 62. In an embodiment, the user device 62 may use an image capturing device to capture an image of the image capturing scene, and execute a face identification algorithm on the captured image to obtain the face image of the user, and use the face image of the user as the biometric feature 602 of the user. In other embodiments, the user device 62 may also use other biometric sensors to detect the user's voice, fingerprints, palm prints, iris, retina, and veins as the biometric feature 602 of the user, and the embodiment is not limited thereto.

Next, the user device 62 employs the deep learning model 604 that supports privacy protection technology to perform de-identification processing on the biometric feature 602 to obtain de-identified data 606, and transforms the de-identified data 606 into the feature vector 608 including a plurality of de-identified features to store the feature vector 608 in the storage device of the user device 62. The above-mentioned privacy protection technologies include differential privacy, homomorphic encryption, shuffle or pixelate, but are not limited thereto.

The user device 62 will dynamically generate a self-key 610 including the feature vector 608 in response to the user's activation operation. The self-key 610 is, for example, a quick response code (QR code) or other types of one-dimensional, two-dimensional or three-dimensional barcodes, and the embodiment is not limited thereto. In some embodiments, the user device 62 may dynamically generate an identification code including the feature vector 608 and time series information as the self-key 610 in response to the user's activation operation, but is not limited thereto.

On the other hand, in the identification stage, the verification device 64 employs the data capturing device to capture the self-key from the user device 62, and employs the biometric feature capturing device to capture the biometric feature 612 of the current user to be identified. In an embodiment, the verification device 64 may employ an image capturing device to capture images of the image capturing scene, and execute a face identification algorithm on the captured images to obtain the face image of the current user, and use the face image of the current user as the biometric feature 612 of the current user.

Next, the verification device 64 employs the biometric identification technology to perform the biometric identification 614. The biometric identification technology includes blink detection, deep learning features, challenge-response technology or three-dimensional stereo cameras, but is not limited thereto. In some embodiments, the verification device 64 may use the image captured by the image capturing device to perform biometric identification. In other embodiments, the verification device 64 may use the biometric features 612 detected by other biometric sensors to perform biometric identification, the embodiment provides no limitation to the implementation of biometric identification.

If it is identified that there is a living body in the biometric feature 612, the verification device 64 will employ the deep learning model 616 that supports privacy protection technology to de-identify the biometric feature 612 so as to obtain the de-identified data 618, transform the de-identified data 618 into a feature vector including a plurality of de-identified features, and compare the feature vector with the feature vector 608 in the self-key 610 captured from the user device 62 to verify the identity of the current user based on the comparison result 620. If the feature vector matches the feature vector 608, it may be confirmed that the identity of the current user is legal; otherwise, it may be confirmed that the identity of the current user is illegal.

In summary, the identity verification system and method of the present disclosure have the following advantages:

High security: The deep learning model that supports privacy protection technology de-identifies biometric features, and performs registration and verification on the de-identified data that undergoes de-identification processing to protect user privacy, and the de-identified feature vector cannot be restored into the original biometric feature and is stored and encrypted. By using this de-identified data to dynamically generate a key, it is possible to provide high-level security protection to prevent the risks of data leakage and identity theft.

Protect user privacy: Storing de-identified data on the local user device makes it possible to avoid storing data in third-party systems, thereby improving the privacy protection of user personal data.

Convenience and flexibility: Using identification codes such as quick response codes (QR codes) as a delivery media of the self-key, users may bring their mobile phones for identity verification at any time without carrying additional documents or cards, and there is support for offline operations to provide good user experience with convenience.

Prevention of hacking: After the feature vector of de-identified data is stored, even if the mobile phone is hacked and relevant information is obtained, when there is no one-time password (OTP) information from the mobile phone time series and there is current real face image or biometric feature, it is not possible to carry out identity identification, so the security of the system may be enhanced.

Two-factor verification: Performing identity verification requires both an authorized quick response code (QR code) and the user's real face image or biometric feature. The two-factor verification mechanism may improve security and prevent attacks from one single factor.

Real-time identification: Performing real-time identification on the user's biometric feature through de-identification processing makes it possible to quickly complete the verification and provide real-time services.

Reduce the risk of data leakage: There is no need to transmit real face images or biometric features to an external server for verification, which reduces the risk of data leakage caused by data transmission.

Non-trace mode: After real-time identification is completed, no current information will be left.

No feature database is required: Personal feature information has been stored in the user's own user device. There is no need for the system to provide a centralized database, which may improve practicality and save costs for storage space.

Compliance with regulations: Compliance may be ensured because it can be ensured that the identity verification process complies with local data protection and privacy regulations and explicit consent from the user can be obtained.

The identity verification system and method of the present disclosure provide an efficient and convenient identity verification mechanism and may be applied to various fields, including:

Financial services and banking industry: In financial transactions, especially online payments and banking services, two-factor verification and privacy protection are crucial. Through the identity verification system and method of the embodiment of the present disclosure, the user's true identity may be confirmed, while protecting user privacy and security of financial transaction.

Enterprise information access and data security: In an enterprise environment, protecting sensitive data and information security is crucial. Two-factor authentication and privacy protection ensure that only authorized users can access specific corporate resources, thus preventing data leakage and unauthorized access.

Health care and medical applications: In the field of health care and medical care, protecting medical records, medical information and user privacy is crucial. Through the identity verification system and method of the embodiment of the present disclosure, true identity verification can be ensured while protecting the security of medical data.

E-commerce platform: On an e-commerce platform, users need to ensure the security and authenticity of transactions, especially those involving sensitive information and payment transactions. Through the two-factor verification and privacy protection provided by the identity verification system and method of the embodiments of the present disclosure, the security of the platform may be reinforced and fraud and data leakage may be prevented.

Government and public affairs: In the field of government and public affairs, especially in scenarios involving personal identity certification and sensitive data, the two-factor verification and privacy protection provided by the identity verification system and method of embodiments of the present disclosure may ensure security and privacy protection for government services.

In the above scenario where a high degree of confirmation of the user's true identity is required, through the identity verification system and method of the embodiment of the present disclosure, the requirements for data and privacy security may be ensured simultaneously.

Although the present disclosure has been disclosed in the above embodiments, they are not intended to limit the present disclosure. Anyone with ordinary knowledge in the technical field can make some modifications and refinement without departing from the spirit and scope of the present disclosure, so the protection scope of the present disclosure shall be determined by the appended claims.

What is claimed is:

1. An identity verification system comprising:
a data capturing device capturing a self-key, wherein the self-key is generated by a first processor, and the first processor performs de-identification processing on a first biometric feature to obtain a first de-identified data, transforms the first de-identified data into a first feature vector having a plurality of first de-identified features, and dynamically generates the self-key having the first feature vector in response to an activation operation, wherein the first processor employs a deep learning model that supports a privacy protection technology to de-identify the first biometric feature, and wherein the deep learning model comprises a plurality of neurons divided into multiple layers, the first biometric feature is transformed into a feature value of a plurality of neurons at a first layer among the multiple layers, and the transformed feature value of each of the neurons is added to a noise generated using a privacy parameter and then input into a next layer, after the multiple layers of processing, the first de-identified data is obtained; and
a second processor capturing a second biometric feature to be identified, performing the de-identification processing on the second biometric feature to obtain a second de-identified data, transforming the second de-identified data into a second feature vector having a plurality of second de-identified data, and comparing the second feature vector with the first feature vector in the self-key to verify the second biometric feature based on a comparison result.

2. The identity verification system according to claim 1, wherein the first processor further dynamically generates an identification code having the first feature vector and time series information as the self-key in response to the activation operation.

3. The identity verification system according to claim 2, wherein the second processor further interprets the first feature vector and the time series information in the identification code, compares the first feature vector with the second feature vector, and compares the time series information with current time information to verify the second biometric feature based on a comparison result.

4. The identity verification system according to claim 1, wherein the data capturing device uses a quick response code (QR code) to establish a connection with the first processor.

5. The identity verification system according to claim 1, further comprising a storage device, and the first processor further encrypts the first feature vector using a data encryption technology, and stores the encrypted first feature vector in the storage device.

6. The identity verification system according to claim 5, wherein the second processor further employs a data decryption technology corresponding to the data encryption technology to decrypt the encrypted first feature vector in the self-key to obtain a first de-identified feature vector.

7. The identity verification system according to claim 1, wherein the second processor further employs a biometric identification technology to identify a living body in the second biometric feature, and when identifying that there is the living body in the second biometric feature, the de-identification processing is performed on the second biometric feature.

8. An identity verification system comprising:
a data capturing device capturing a self-key, wherein the self-key is generated by a first processor, and the first processor performs de-identification processing on a first biometric feature to obtain a first de-identified data, transforms the first de-identified data into a first feature vector having a plurality of first de-identified features, and dynamically generates the self-key having the first feature vector in response to an activation operation; and
a second processor capturing a second biometric feature to be identified, performing the de-identification processing on the second biometric feature to obtain a second de-identified data, transforming the second de-identified data into a second feature vector having a plurality of second de-identified data, and comparing the second feature vector with the first feature vector in the self-key to verify the second biometric feature based on a comparison result,
wherein the second processor further employs a biometric identification technology to identify a living body in the second biometric feature, and when identifying that there is the living body in the second biometric feature, the de-identification processing is performed on the second biometric feature, and
wherein the biometric identification technology comprises a blink detection, deep learning features, a challenge-response technology or a three-dimensional stereo camera.

9. An identity verification method, adaptable for an identity verification system comprising a user device and a verification device, and the method comprising:
capturing a first biometric feature by a first biometric feature capturing device of the user device;
performing de-identification processing on the first biometric feature to obtain a first de-identified data, transform the first de-identified data into a first feature vector having a plurality of de-identified features and store the first feature vector in a storage device, and dynamically generate a self-key having the first feature vector in response to an activation operation;
capturing the self-key from the user device by a data capturing device of the verification device;
capturing a second biometric feature to be identified by a second biometric feature capturing device; and
performing the de-identification processing on the second biometric feature to obtain a second de-identified data, and transform the second de-identified data into a second feature vector having a plurality of second de-identified features to compare with the first feature vector in the self-key, and verify the second biometric feature according to a comparison result,
wherein the user device employs a deep learning model that supports a privacy protection technology to de-identify the first biometric feature, and wherein the deep learning model comprises a plurality of neurons divided into multiple layers, the first biometric feature is transformed into a feature value of a plurality of neurons at a first layer among the multiple layers, and the transformed feature value of each of the neurons is added to a noise generated using a privacy parameter and then input into a next layer, after the multiple layers of processing, the first de-identified data is obtained.

10. The identity verification method according to claim 9, wherein the user device further dynamically generates an identification code having the first feature vector and time series information as the self-key in response to the activation operation.

11. The identity verification method according to claim 10, wherein the verification device further interprets the first feature vector and the time series information in the identification code, compares the first feature vector with the second feature vector, and compares the time series information with current time information to verify the second biometric feature based on a comparison result.

12. The identity verification method according to claim 9, wherein the verification device employs a quick response code (QR code) to establish a connection with the user device.

13. The identity verification method according to claim 9, wherein the user device further encrypts the first feature vector using a data encryption technology, and stores the encrypted first feature vector in the storage device.

14. The identity verification method according to claim 13, wherein the verification device further employs a data decryption technology corresponding to the data encryption technology to decrypt the encrypted first feature vector in the self-key to obtain the first feature vector.

15. The identity verification method according to claim 9, wherein the verification device further employs a biometric identification technology to identify a living body in the second biometric feature, and when identifying that there is a living body in the second biometric feature, the de-identification processing is performed on the second biometric feature.

* * * * *